G. E. LYNCH.
CABLE REEL.
APPLICATION FILED JULY 8, 1905. RENEWED AUG. 15, 1907.
951,955.
Patented Mar. 15, 1910.
3 SHEETS—SHEET 1.
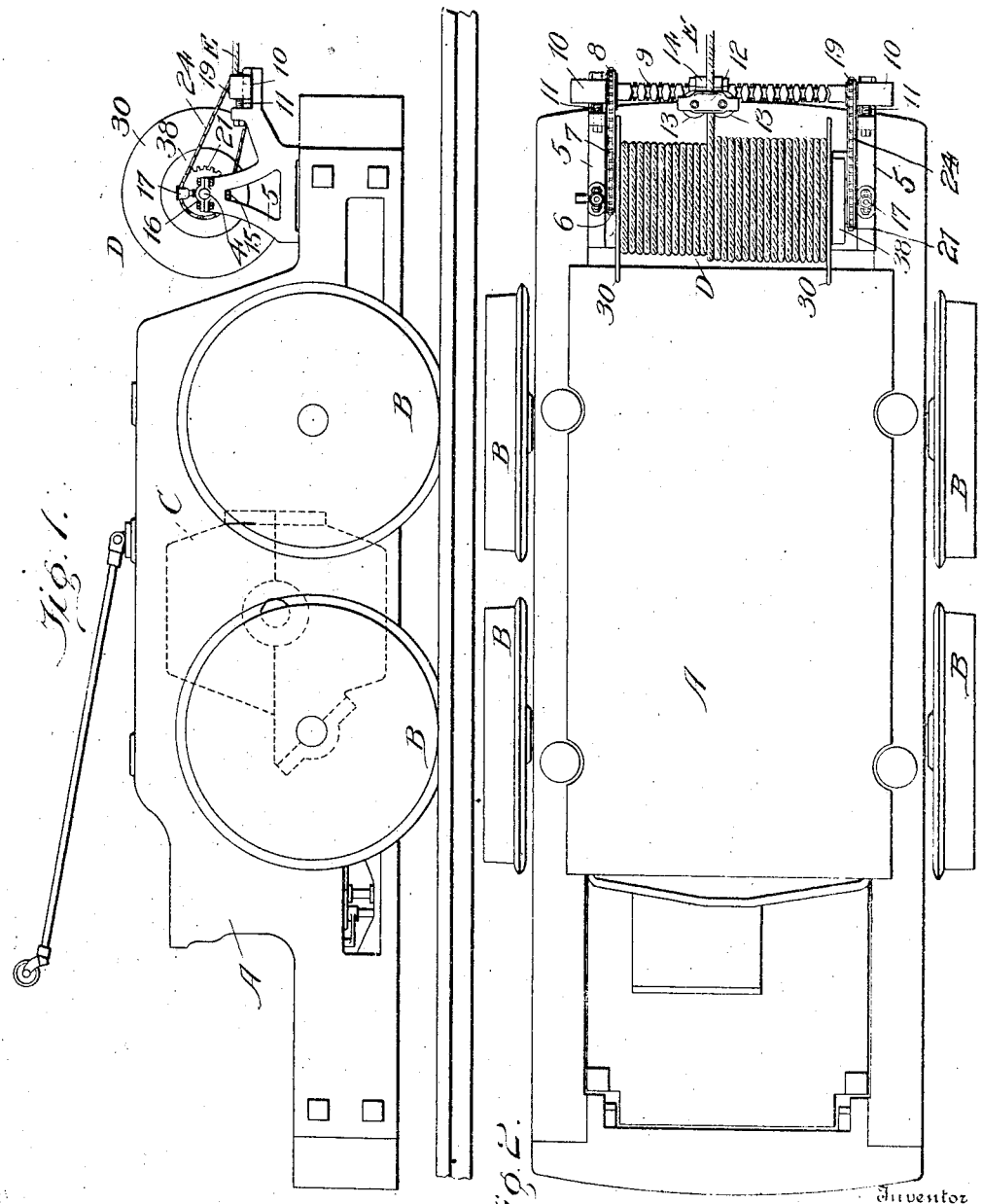

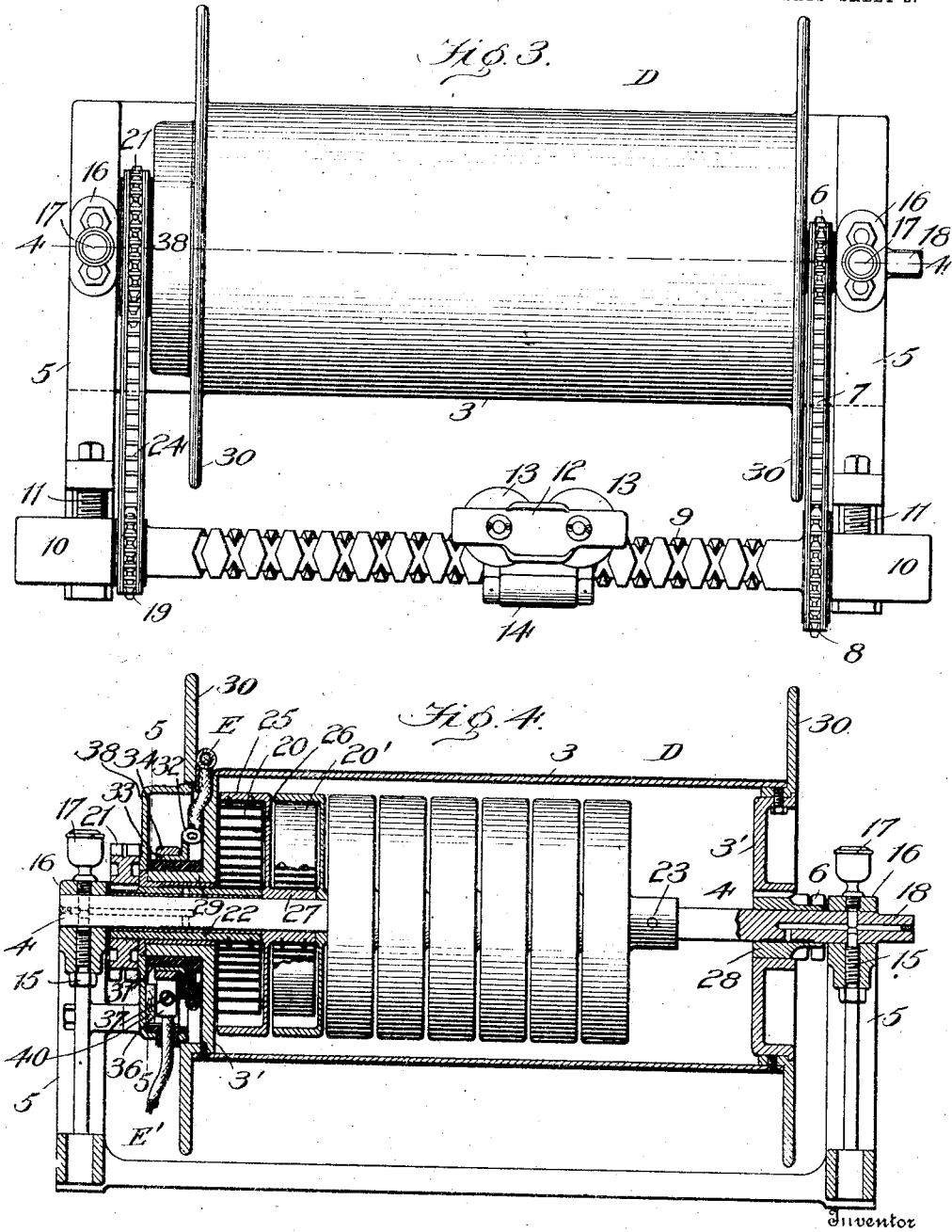

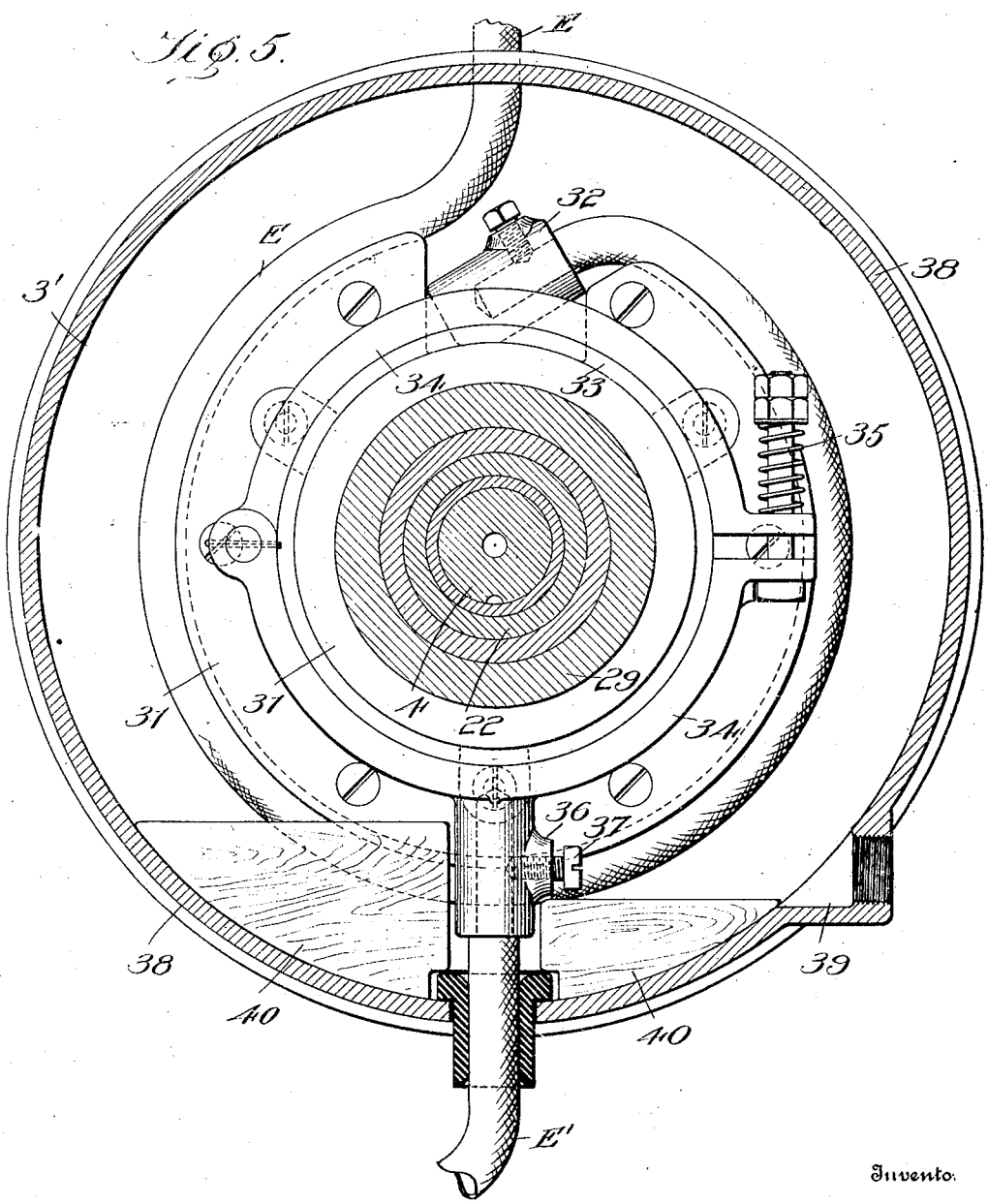

UNITED STATES PATENT OFFICE.

GEORGE E. LYNCH, OF COLUMBUS, OHIO, ASSIGNOR, BY MESNE ASSIGNMENTS, TO THE JEFFREY MANUFACTURING COMPANY, A CORPORATION OF OHIO.

CABLE-REEL.

951,955.  Specification of Letters Patent.  Patented Mar. 15, 1910.

Application filed July 8, 1905, Serial No. 268,867. Renewed August 15, 1907. Serial No. 388,681.

*To all whom it may concern:*

Be it known that I, GEORGE E. LYNCH, a citizen of the United States, residing at Columbus, in the county of Franklin and State of Ohio, have invented certain new and useful Improvements in Cable-Reels, of which the following is a specification, reference being had therein to the accompanying drawing.

This invention relates to mechanism for operating the cable winding reel of an electric traction system, and is especially adapted for use in connection with electric locomotives such as are used in mines.

There are now several well known types of cable winding reels, that to which my present invention relates belonging to the self-contained, spring-operated variety. The advantages that are incident to this style of cable reel are now so well known that they need not be herein stated. One disadvantage, however, that has been found incident to cable reels of this type, as heretofore constructed, is the fact that they do not allow the locomotive a desirably great range of movement; for, it must be remembered, the spring that serves as the reel-motor is wound or put under tension whenever the locomotive moves away from the place where the cable is made fast, and difficulty has been experienced in producing a spring element that does not become tightly wound up before the locomotive has arrived at the limit of its run. The use of a single spring as the motor element is not practicable and it has therefore been proposed to use a plurality of coiled springs connected together end to end, thus producing in effect a very long spring from a plurality of shorter sections. But even with this expedient, which I prefer to retain, difficulty is experienced in getting sufficient spring length to operate a long cable when the connection between the cable reel or drum and the spring is direct, as has heretofore been proposed.

I have overcome the objectionable features indicated by interposing between the reel or drum on which the cable is wound and the spring that is employed to wind the cable thereupon a speed reducing gearing so that a turn of the reel, indicating a certain distance of movement of the locomotive, produces but a part of a revolution or turn of the winding element for the spring. By this expedient I am enabled to produce a spring-operated cable reel that is self-contained, is exceedingly compact and simple in its construction, that allows the locomotive a desirable range of movement, and that possesses other advantages hereinafter pointed out.

In the accompanying drawings I have illustrated one form of my invention, representing it as applied to a mine electric locomotive.

Figure 1 is a side elevation of such a locomotive provided with my invention. Fig. 2 is a top plan view of the parts illustrated in Fig. 1. Fig. 3 is a plan view of the reel and some of the associated parts drawn on a much larger scale than Fig. 1. Fig. 4 is a longitudinal section through the reel, taken on the line 4—4 of Fig. 3. And Fig. 5 is a vertical section taken on the dotted line 5—5 of Fig. 4.

In the drawings A represents the frame of the locomotive, B the traction wheels thereof and C the motor of the locomotive. At one end of the locomotive is supported the reel D upon which is wound the cable E through which the current that operates the motor is supplied. It will be understood that the outer or free end of the cable is attached at some convenient point to the main supply conductor and that the cable is of a length at least equal to the longest run the locomotive is expected to make from the starting point, or the point where the connection of the cable with the main conductor is made.

The reel consists of a hollow drum 3, the heads 3', 3', and the flanges 30, 30 and is mounted upon a stationary shaft 4 mounted in suitable brackets or standards 5 that may be secured to any suitable part of the locomotive. The head 3' of the reel is preferably separate from both the drum and the flange, to which it is united by screws or bolts so as to be easily removable to give access to the interior of the reel. To it is secured the hub 28 that surrounds and is loosely mounted upon the shaft 4. The other head 3' is preferably formed integral with the reel flange 30, and is provided with a hub or bearing 29, between which and the shaft is arranged a sleeve 22, to be later described. Upon the hub 28 of the reel is mounted a sprocket pinion 6 that is connected by a chain 7 with a sprocket wheel 8, mounted upon a cross shaft 9 disposed parallel with and in front of the drum 2. The shaft 9 is double threaded and mounted in suitable bearings 10, which are preferably adjustable toward and from the bearings for the shaft 4, screws 11 being employed to effect the desirable adjustment. Upon the double screw threaded shaft or rod 9 is mounted a traveler 12 in which are mounted suitable guiding wheels or pulleys, 13 and 14, between and over which the cable passes. This traveler may be of any suitable construction, its function being to guide the cable and cause it to be laid evenly upon the drum as it is wound thereupon.

The shaft 4 is held from turning by the screws 15 seated in the brackets 5, and arranged to have their ends enter recesses in the shaft. The caps 16, that fit over the shaft and are connected with the brackets 5, carry the oil cups 17 from which suitable ducts convey the lubricant to the reel bearings. The end 18 of the shaft is shaped to receive a tool by which it may be turned for a purpose that will be later described.

Upon the end of the shaft 9 opposite the sprocket wheel 8 there is mounted a sprocket pinion 19 that is connected, by a chain 24, with a sprocket wheel 21 secured fast to a sleeve 22 loosely mounted upon the shaft 4, and to which is connected one end of the spring element that actuates to wind the cable upon the reel. The other end of the spring element, which is mounted within the hollow drum D, is secured fast to the shaft 4, at 23. The form of spring-actuating mechanism, (also termed spring element) that I propose to employ is one formed of a plurality of comparatively short (say twenty feet) sections of coiled springs united end to end, so as to produce a compound driving spring of the desired length, and equal to the combined length of the several component elements thereof. Flat coiled springs are the most suitable for this purpose, and such springs are represented at 20. Beginning with the spring shown at the left of Fig. 4, it will be seen that its inner end is connected with the sleeve 22, and its outer end with the flange 25 of a housing for the spring, that also serves as the connecting member between it and the next spring 20' of the series. This housing has a wall 26 disposed between the two springs, 20 and 20', and a hub 27 loosely mounted upon the shaft 4, and to which is secured the inner end of the spring 20'. The outer end of the spring 20' is connected to the flange of the second housing which serves to connect it with the third spring of the series, and thus the springs are connected one to the next to the desired number, the hub of the last housing being secured fast to the shaft, at 23.

It will be seen from this description, and the illustration of my invention in the drawings, that I have produced an automatically operating, self-contained cable reel, the motor of which is of the coiled spring variety; and that one end of such spring is secured to a fixed, non-rotating shaft, while the other end is connected through a train of gearing with the drum on which the cable is wound. As the pinion 6 on the hub of the drum is smaller than the wheel 8 to which it is geared, and the pinion 19 is likewise smaller than the wheel 21 that is connected with the spring motor, the gearing operates to reduce the speed of rotation of the spring relative to that of the drum with the advantages that have already been referred to. The shaft 9 not only serves as a member of this speed-reducing gearing, but also as the screw shaft for the traveler 12, thus performing a double function, and permitting a reduction of the number of parts of the apparatus to a minimum.

The reel-attached end of the cable is carried through an aperture in the head 3', and laid in a groove around an insulating ring 31 that is secured fast to the reel head. The end of the cable is secured in a contact socket 32, that is formed with or secured to a contact ring 33, preferably made of bronze, secured fast to the insulating ring 32 so as to revolve therewith and with the reel. A split ring 34, also preferably formed of bronze, surrounds and bears upon the ring 33, being held in close engagement therewith by the spring 35 that tends to draw its two parts together. One of the sections of the two-part contact ring 34 is provided with a socket 36, in which the end of the cable or conductor E', that goes to the controller on the locomotive, is secured by means of a set screw 37.

The contact devices just described are covered and protected by a cap 38 suitably supported by the bracket 5. The cable E' may be connected and disconnected with the collector ring 34 without necessitating the removal of the cover or cap 38, as a hole 39 is formed therein opposite the screw 37, through which a screw driver for manipulating the screw may be passed and operated. Ordinarily when the locomotive is in use this hole is kept closed by a plug. In the bottom of the cap or cover 38, that is, in that portion adjacent to the socket 36, is fitted a piece of material, 40, preferably of wood, that operates to prevent the contact ring 34 from turning, by engaging with the socket 36.

It will be understood that the spring should be under the least tension when the cable is entirely wound upon the reel, but even then there should be a certain amount of residual tension in the spring in order to insure the movements of the parts to cause the final winding. To secure this tension the cable is first entirely wound upon the reel and the free end thereof held, while the screws 15 are withdrawn and the caps 16 loosened to release the shaft 4. A wrench or other tool is then applied to its square end 18 thereof and the shaft turned in the direction to put the spring under tension sufficient to cause a pull of about 20 pounds upon the cable, after which the shaft should be set.

What I claim is:

1. In a cable reeling mechanism for an electric locomotive, the combination of an electric cable reel, a plurality of coiled springs arranged within said reel for controlling its rotary movements, a gear wheel mounted concentrically and rigidly with the cable reel at one end thereof, and gearing interposed between said gear wheel and one end of the spring adjacent to the end of said reel opposite the end provided with the said gear wheel.

2. In a cable reeling mechanism for an electric locomotive, the combination with an electric locomotive, of an electric cable reel suitably mounted thereon, a gear wheel mounted concentrically and rigidly with the cable reel and at one end thereof, a plurality of springs arranged within said reel and connected in series for controlling its rotary movements, and gearing interposed between the said gear wheel and the spring adjacent the end of the reel opposite the end provided with the said gear wheel.

3. The combination of a cable reel or drum, a shaft exterior thereto and parallel therewith, gearing between one end of the reel or drum and the shaft, a coiled spring one end of which is made fast, and gearing between said shaft and the other end of the spring arranged to wind the spring and put it under tension when the reel or drum is turned in one direction, substantially as set forth.

4. The combination of a reel or drum upon the exterior of which a cable may be wound, a stationary shaft upon which the reel or drum turns, a coiled spring arranged within the reel or drum and having one end fast to the shaft, a power-transmitting shaft parallel with the axis of the reel or drum, gearing between one end of the drum and the said power-transmitting shaft, and gearing between the other end of such shaft and the free end of the spring, the said train of gearing operating to transmit motion from the drum to the spring to wind the latter when the reel or drum is turned in one direction, or to transmit motion from the spring to the reel or drum to turn the same in the other direction, substantially as set forth.

5. The combination of a hollow drum, a fixed shaft about which the drum turns, a shaft outside of and parallel with the axis of the drum, a coiled spring arranged within the drum and having one end fixed to the shaft, a speed-reducing gearing between one end of the drum and the counter shaft, and speed-reducing gearing between the other end of the counter shaft and the free end of the spring, substantially as set forth.

6. The combination of a cable reel or drum, a coiled spring for operating the same made fast at one end, a screw-threaded shaft parallel with the drum, a traveler 12 mounted upon the said screw-threaded shaft for uniformly laying the cable upon the drum, gearing between one end of the drum and the said screw-threaded shaft, and gearing between the shaft and the free end of the spring, substantially as set forth.

7. In a self-contained, spring-operated cable winding reel, the hereindescribed hollow drum having contact devices at one end and having the head at the opposite end removable, whereby access to the interior of the drum is permitted, substantially as set forth.

8. In a cable reel, the combination of the winding drum, a grooved ring of insulating material supported at one end of the drum adapted to receive the end portion of the cable, a ring, 33, of conducting material supported by the said insulating ring and provided with a contact socket for the end of the cable, and a collecting ring bearing upon the ring 33 provided with a socket for the end of the cable that leads to the motor, substantially as set forth.

9. In a cable reel, the combination of the drum upon which the cable is wound, an insulated conducting ring, 33, with which the end of the cable wound upon the reel is connected, a two-part collecting ring, 34, to which the cable or conductor that leads to the motor is connected surrounding the said conducting ring 33, a rod connected to one part of the collecting ring, and a compression spring connected to and interposed between the rod and the other part of the collecting ring for holding the two parts of the ring 34 together and in engagement with the ring 33, substantially as set forth.

10. In a cable reeling mechanism for an electric locomotive, the combination with an electric locomotive of an electric cable reel suitably mounted thereon, spring motor mechanism for controlling the movements of said cable reel, a cable spooling and guiding device having a reciprocatable cable guide, power transmitting mechanism interposed between one end of said spring motor and said cable spooling and guiding device, and power transmitting mechanism interposed between said cable spooling and guiding device and said reel.

11. In a cable reeling mechanism for an electric locomotive, the combination with an electric locomotive, of an electric cable reel suitably mounted thereon, spring motor mechanism for controlling the movements of said cable reel, a cable spooling and guiding device having a reciprocatable cable guide, speed-reducing power transmitting mechanism interposed between one end of said reel and said cable spooling and guiding device, and speed-reducing power transmitting mechanism interposed between said cable spooling and guiding device and one end of said spring motor.

12. In a cable reeling mechanism for an electric locomotive, the combination of a hollow electric cable reel having a head provided with a detachable portion arranged to permit access to the interior of the reel without necessitating the removal of said head, and motor mechanism arranged within said reel for controlling its rotary movements.

13. In a cable reeling mechanism for an electric locomotive, the combination of a hollow electric cable reel having a head provided with a detachable central portion arranged to permit access to the interior of the reel without necessitating the removal of said head, and motor mechanism arranged within said reel for controlling its rotary movements.

14. In a cable reeling mechanism for an electric locomotive, the combination of a hollow electric cable reel having at one end a head formed in one piece and at its other end a head provided with a detachable portion, whereby access to the interior of the reel through one end thereof is permitted without necessitating removal of the head at that end, motor mechanism arranged within said reel for controlling its rotary movements, and suitable electric collecting devices carried by the one-piece reel head.

In testimony whereof I affix my signature, in presence of two witnesses.

GEORGE E. LYNCH.

Witnesses:
FRANK H. CHURCH,
A. S. HARTLE.